United States Patent
Matsuike

(10) Patent No.: US 11,182,957 B2
(45) Date of Patent: Nov. 23, 2021

(54) IMAGE PROCESSING DEVICE, IMAGE PROCESSING METHOD, AND PROGRAM FOR SUPPRESSING MOVEMENT OF AN OBJECT IN VIRTUAL SPACE

(71) Applicant: Sony Interactive Entertainment Inc., Tokyo (JP)

(72) Inventor: Hiroshi Matsuike, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/757,657

(22) PCT Filed: Oct. 22, 2018

(86) PCT No.: PCT/JP2018/039228
§ 371 (c)(1),
(2) Date: Apr. 20, 2020

(87) PCT Pub. No.: WO2019/082854
PCT Pub. Date: May 2, 2019

(65) Prior Publication Data
US 2020/0327730 A1    Oct. 15, 2020

(30) Foreign Application Priority Data
Oct. 26, 2017  (JP) .............................. JP2017-207362

(51) Int. Cl.
*G06T 19/00*     (2011.01)
*G06T 7/70*      (2017.01)
*G06T 7/20*      (2017.01)

(52) U.S. Cl.
CPC ................ *G06T 19/00* (2013.01); *G06T 7/20* (2013.01); *G06T 7/70* (2017.01)

(58) Field of Classification Search
CPC .............. G06T 19/00; G06T 7/70; G06T 7/20
See application file for complete search history.

(56) References Cited

U.S. PATENT DOCUMENTS

2003/0128208 A1    7/2003   Shih
2010/0241998 A1*   9/2010   Latta ....................... G06F 3/017
                                                             715/862

(Continued)

FOREIGN PATENT DOCUMENTS

JP       2008217260 A  *  9/2008
JP       2008217260 A     9/2008

OTHER PUBLICATIONS

Okaichi, N., "A virtual painting knife", Jun. 2008, Visual Computer vol. 24, pp. 753-763 (Year: 2008).*

(Continued)

*Primary Examiner* — Terrell M Robinson
(74) *Attorney, Agent, or Firm* — Matthew B. Dernier, Esq.

(57) ABSTRACT

Objects are moved naturally while occurrence of vibration due to contact between a movable object and a fixed object is suppressed. An image processing device obtains a movement toward a given direction of at least one point of a first object in a virtual space, suppresses the movement of the at least one point of the first object, when a second object that is brought into contact with the first object and whose angle formed with a direction of a reaction force to the first object and the given direction falls within a predetermined range is present, and a movement of the second object is limited in the virtual space, calculates a motion of the first object on the basis of the suppressed movement of the at least one point, and draws an image including the first object on the basis of the calculated motion.

9 Claims, 7 Drawing Sheets

(56) References Cited

U.S. PATENT DOCUMENTS

| | | | | |
|---|---|---|---|---|
| 2010/0299121 | A1* | 11/2010 | Bond | G06F 30/20 |
| | | | | 703/6 |
| 2011/0244959 | A1* | 10/2011 | Inagaki | G06F 3/017 |
| | | | | 463/31 |
| 2012/0081276 | A1* | 4/2012 | Ullrich | G06F 1/1694 |
| | | | | 345/156 |
| 2013/0286004 | A1* | 10/2013 | McCulloch | G06T 19/006 |
| | | | | 345/419 |
| 2015/0355711 | A1* | 12/2015 | Rihn | A63F 13/285 |
| | | | | 340/407.2 |
| 2017/0330362 | A1* | 11/2017 | Sumner | G06T 19/006 |

OTHER PUBLICATIONS

International Preliminary Report on Patentability and Written Opinion for corresponding PCT Application No. PCT/JP2018/039228, 11 pages, dated May 7, 2020.

International Search Report for corresponding PCT Application No. PCT/JP2018/039228, 3 pages, dated Dec. 4, 2018.

Okaichi, Naoto et al., "3D Painting Knife Model for Interactive Oil Paintings and Drawings" Visual Computing/Graphics and CAD Joint Symposium 2007, Proceedings, pp. 241-246, Jun. 23, 2007 (for relevancy see ISR for corresponding PCT Application No. PCT/JP2018/039228 cited above).

Anthony Talvas, Maud Marchal, Christian Duriez and Miguel A. Otaduy, "Aggregate Constraints for Virtual Manipulation with Soft Fingers," IEEE, pp. 1-10, Mar. 23, 2015 (for relevancy see ISR for corresponding PCT Application No. PCT/JP2018/039228 cited above).

\* cited by examiner

CONTACT INFORMATION LIST OF DIRECT ACTION OBJECT 31

CONTACT INFORMATION LIST OF OBJECT 32

CONTACT INFORMATION LIST OF OBJECT 33

CONTACT INFORMATION LIST OF OBJECT 34

IMAGE PROCESSING DEVICE, IMAGE PROCESSING METHOD, AND PROGRAM FOR SUPPRESSING MOVEMENT OF AN OBJECT IN VIRTUAL SPACE

TECHNICAL FIELD

The present invention relates to an image processing device, an image processing method, and a program.

BACKGROUND ART

In recent years, a technology in which objects are disposed in a three-dimensional virtual space to display an image generated by simulating a physical action imposed between the objects has been conducted. Examples of such a technology include the virtual reality technology. A technology in which the objects in the virtual space are moved according to, for example, motions of fingers of a hand to display an image of the objects has been also conducted.

NPL 1 discloses a technology in which, when an object is held by a hand, deformation of fingers and friction of a contact surface are simulated by using the finite element method to represent a movement of the object by the hand.

CITATION LIST

Non Patent Literature

[NPL 1] Anthony Talvas, Maud Marchal, Christian Duriez and Miguel A. Otaduy, "Aggregate Constraints for Virtual Manipulation with Soft Fingers," Mar. 27, 2015

SUMMARY

Technical Problem

For example, when an object (action object) is moved by a hand disposed in a virtual space, and the object is continuously pressed against another fixed object, the action object vibrates in some cases (hereinafter, this phenomenon is also referred to as "jittering") due to, for example, accuracy of iterative calculation for canceling collision. On the other hand, when a movement of the action object that has been brought into contact with the fixed object is simply stopped, a motion of the action object becomes unnatural in some cases.

The present invention is made in consideration of the above issue, and its object is to provide a technology for achieving a natural motion of an object while occurrence of vibration due to contact between a movable object and an object whose movement is limited is suppressed in a physical simulation in a virtual space.

Solution to Problem

To solve the above problem, an image processing device according to the present invention includes obtaining means for obtaining a movement toward a given direction of at least one point of a first object in a virtual space, suppressing means for suppressing the movement of the at least one point of the first object, when a second object that is brought into contact with the first object and whose angle formed with a direction of a reaction force to the first object and the given direction falls within a predetermined range is present, and a movement of the second object is limited in the virtual space, calculation means for calculating a motion of the first object on the basis of the suppressed movement of the at least one point, and image drawing means for drawing an image including the first object on the basis of the calculated motion.

An image processing method according to the present invention includes the steps of obtaining a movement toward a given direction of at least one point of a first object in a virtual space; suppressing the movement of the at least one point of the first object, when a second object that is brought into contact with the first object and whose angle formed with a direction of a reaction force to the first object and the given direction falls within a predetermined range is present, and a movement of the second object is limited in the virtual space; calculating a motion of the first object on the basis of the suppressed movement of the at least one point, and drawing an image including the first object on the basis of the calculated motion.

A program according to the present invention causes a computer to function as obtaining means for obtaining a movement toward a given direction of at least one point of a first object in a virtual space; suppressing means for suppressing the movement of the at least one point of the first object, when a second object that is brought into contact with the first object and whose angle formed with a direction of a reaction force to the first object and the given direction falls within a predetermined range is present, and a movement of the second object is limited in the virtual space; calculation means for calculating a motion of the first object on the basis of the suppressed movement of the at least one point; and image drawing means for drawing an image including the first object on the basis of the calculated motion.

According to the present invention, in a physical simulation in a virtual space, objects can be moved naturally, while occurrence of vibration due to contact between a movable object and an object whose movement is limited is suppressed.

According to one aspect of the present invention, the suppressing means may suppress the movement of the at least one point of the first object, when the second object that is brought into contact with the first object and whose angle formed with the direction of the reaction force to the first object and the given direction falls within the predetermined range is present, and the second object is fixed in the virtual space.

According to one aspect of the present invention, the suppressing means may search for a new second object that is brought into contact with the second object and whose angle formed with a direction of a reaction force to the second object and the given direction falls within the predetermined range, when the second object whose angle formed with the direction of the reaction force to the first object and the given direction falls within the predetermined range is present, and the movement of the second object is not limited in the virtual space, and may suppress the movement of the at least one point of the first object when the new second object is fixed.

According to one aspect of the present invention, the direction of the reaction force to the first object may be a direction of a normal line at a contact point of the second object with the first object.

According to one aspect of the present invention, the obtaining means may obtain an instruction for a movement of an instruction target object that is brought into contact with the first object at the at least one point, and may obtain a direction of the movement of the instruction target object as the given direction.

According to one aspect of the present invention, the suppressing means may calculate a distance between the instruction target object and a peripheral object, and may suppress the movement of the instruction target object when the distance satisfies a given condition.

According to one aspect of the present invention, the suppressing means may suppress a motion of a hand stronger than a case where the distance satisfies the given condition, when the second object that is brought into contact with the first object and whose angle formed with the direction of the reaction force to the first object and the given direction falls within the predetermined range is present, and the movement of the second object is limited in the virtual space.

DESCRIPTION OF EMBODIMENT

Hereinafter, an embodiment according to the present invention will be described with reference to drawings. Among constituents indicated in the description, constituents having an identical function are denoted by an identical reference sign, and description thereof will be omitted.

In the present embodiment, an image processing device 1 capable of moving an instruction target object in a virtual space according to an actual operation of a user, and further moving an object in the virtual space by the instruction target object in the virtual space will be described.

Figure 1:
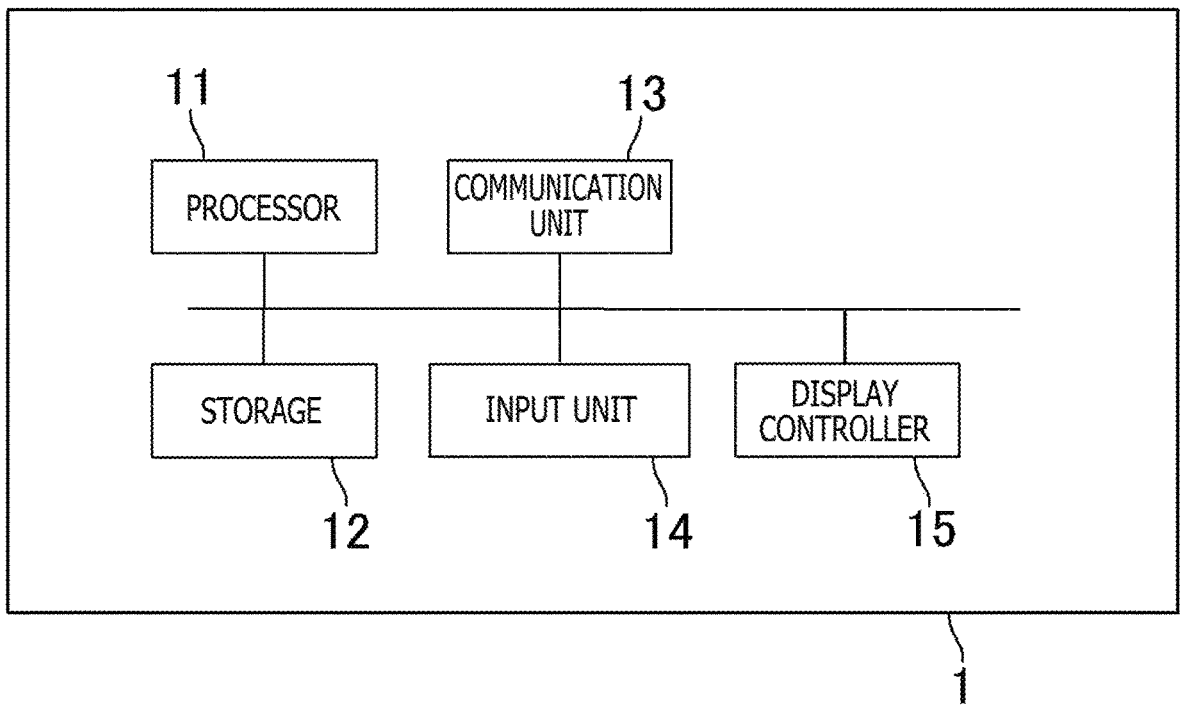
FIG. 1 is a view illustrating an example of a hardware configuration of an image processing device according to an embodiment of the present invention.

FIG. 1 is a view illustrating an example of a hardware configuration of the image processing device 1 according to the embodiment of the present invention. The image processing device 1 is a personal computer, a home video game console, or a mobile terminal. The image processing device 1 includes a processor 11, a storage 12, a communication unit 13, an input unit 14, and a display controller 15.

The processor 11 operates according to a program stored in the storage 12, and controls, for example, the communication unit 13, the input unit 14, and the display controller 15. Note that the above program may be provided while being stored in a computer-readable medium such as a flash memory, or may be provided through a network such as the Internet.

The storage 12 is configured with a memory element such as a dynamic random access memory (DRAM) or a flash memory. The storage 12 stores the above program. Further, the storage 12 stores information and a computation result input from, for example, the processor 11 and the communication unit 13. Note that the storage 12 may further be configured with a storage device such as a hard disk.

The communication unit 13 is configured with an integrated circuit configuring a wired local area network (LAN) or a wireless LAN, a connector, and an antenna, for example. The communication unit 13 has a function for communicating with other devices via the network. On the basis of control of the processor 11, the communication unit 13 inputs information received from the other devices to the processor 11 or the storage 12, and transmits information to the other devices.

The input unit 14 is a circuit for obtaining an input from hardware that detects a user operation. The input unit 14 obtains an input signal from an input device such as a motion capture or a controller, and inputs information made by converting the input signal to the processor 11 or the storage 12.

The display controller 15 includes a circuit for controlling a display output device such as an external display or a head mounted display. On the basis of control of the processor 11, the display controller 15 causes the display output device to display an image.

Figure 2:
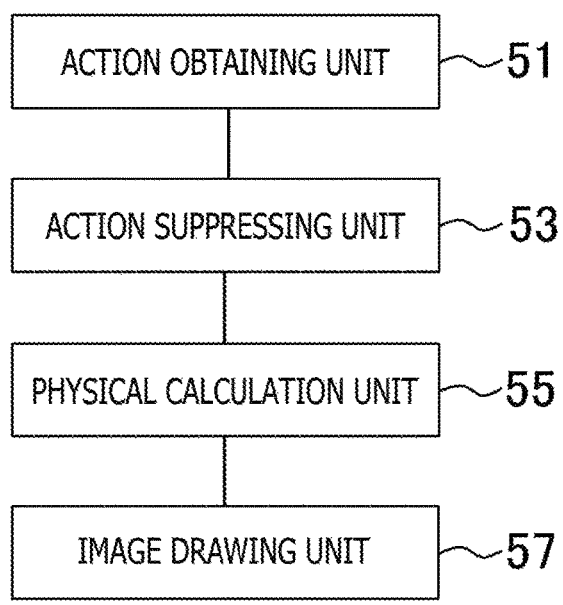
FIG. 2 is a block diagram illustrating functions implemented by the image processing device.

Functions and processes implemented by the image processing device 1 will be described. FIG. 2 is a block diagram illustrating the functions implemented by the image processing device 1. The image processing device 1 functionally includes an action obtaining unit 51, an action suppressing unit 53, a physical calculation unit 55, and an image drawing unit 57. The action obtaining unit 51 is mainly implemented by the processor 11 executing a program stored in the storage 12, to obtain information from the controller or the motion capture via the input unit 14, process the information, and store the processed result in the storage 12. The action suppressing unit 53 and the physical calculation unit 55 are mainly implemented by the processor 11 executing the program stored in the storage 12, to process the information stored in, for example, the storage 12, and store the processed result in the storage 12. The image drawing unit 57 is mainly implemented by the processor 11 executing the program stored in the storage 12, to process the information stored in, for example, the storage 12, and control the display controller 15 such that the display output device displays an image.

Figure 3:
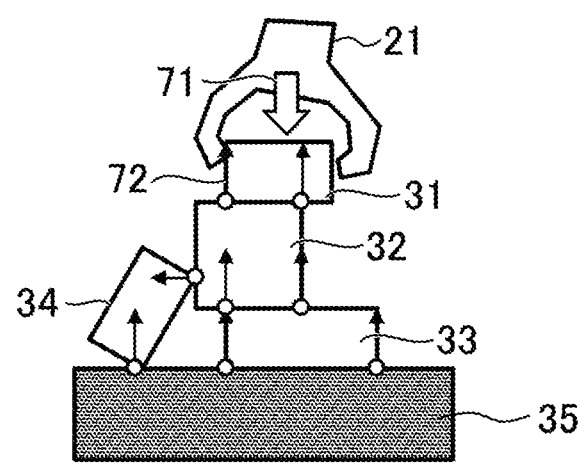
FIG. 3 is a view illustrating an example of a hand and a plurality of objects that are brought into contact with each other.

The action obtaining unit 51 obtains an instruction for moving the instruction target object in the virtual space. FIG. 3 is a view illustrating an example of a hand 21 and a plurality of objects that are brought into contact with each other. Examples of the instruction target object include the hand 21. However, the instruction target object may be another object that is moved by, for example, the controller, and is different from the hand 21. The action obtaining unit 51 also obtains a direction of the movement of the hand 21 (hereinafter, referred to as an "instructed direction 71"). The action obtaining unit 51 also sets a physical parameter (a speed or a force) according to the movement of the hand 21 to an object grasped by the hand 21 or an object that is brought into contact with the hand 21 at a contact point (hereinafter, this object is described as a "direct action object 31"). In a regular case, the instructed direction 71 and a direction of the speed or the force applied to the contact point of the direct action object 31 are equal to each other. In the present embodiment, when the direct action object 31 is grasped by the hand 21, the action obtaining unit 51 sets a speed according to the movement of the hand 21 to a center of gravity of the direct action object 31. When the direct action object 31 is not grasped by the hand 21, the action obtaining unit 51 sets the speed according to the movement of the hand 21 to the contact point of the direct action object 31. Note that the action obtaining unit 51 may set a speed to at least a part of the direct action object 31 on the basis of any instruction or calculation, instead of setting of the speed defined by the contact between the hand 21 and the direct action object 31.

When an object 32 that is brought into contact with the direct action object 31 and whose angle formed with a direction of a normal line at the contact point with the direct action object 31 and the instructed direction 71 falls within a predetermined range is present, and the object 32 is fixed in the virtual space, the action suppressing unit 53 suppresses the movement of at least one point of the direct action object 31. In the present embodiment, the action suppressing unit 53 suppresses the movement of the at least one point of the direct action object 31 by suppressing the movement of the hand 21. The direction of the normal line at the contact point is used as a direction of a reaction force from the object 32 to the direct action object 31, but the direction of the reaction force may be obtained with another method. The predetermined range includes 180 degrees that is completely opposite to an original angle, and excludes an angle orthogonal to the original angle. Only in a case where the object 32 is fixed in the virtual space, the action suppressing unit 53 does not necessarily have to suppress the movement of the at least one point of the direct action object 31. For example, a case where an upper limit of a movement speed of the object 32 is limited to be significantly smaller than movement speeds of other objects may also be handled in the same manner as the case where the object 32 is fixed. Herein, when the object 32 whose normal line at the contact point with the direct action object 31 is opposite to the instructed direction 71 is present, and the object 32 is not fixed in the virtual space, the action suppressing unit 53 searches for a new object 33 that is brought into contact with the object 32 and whose normal line at a contact point with the object 32 is opposite to the instructed direction 71, and suppresses the movement of the at least one point of the direct action object 31 when the new object 33 is fixed. Note that the action suppressing unit 53 does not extract an object 34 whose normal line at a contact point is not opposite to the instructed direction 71 as the new object. In FIG. 3, circles described between objects indicate contact points between those objects, and arrows indicate directions of collision normal lines 72 at those contact points.

Until a fixed object 35 is found (e.g., a case in FIG. 3) or until a new contact object is not found, the action suppressing unit 53 repeats a flow in such a manner that, when the new object is not fixed, the action suppressing unit 53 defines the new object as a processing target object, and searches for a new object that is brought into contact with the processing target object and whose angle formed with a direction of a normal line at a contact point with the processing target object and the instructed direction 71 falls within a predetermined range; and when the new object is fixed, the action suppressing unit 53 suppresses the movement of the at least one point of the direct action object 31.

The physical calculation unit 55 calculates motions of a plurality of objects including the direct action object 31 in the virtual space, on the basis of movements of the plurality of objects including the direct action object 31, which are set by the processes of the action obtaining unit 51 and the action suppressing unit 53. The physical calculation unit 55 calculates the motions of the plurality of objects according to a procedure that simulates a physical principle.

The image drawing unit 57 draws a three-dimensional image of the objects including the direct action object 31 on the basis of the calculated motions of the plurality of objects including the direct action object 31.

Figure 4:
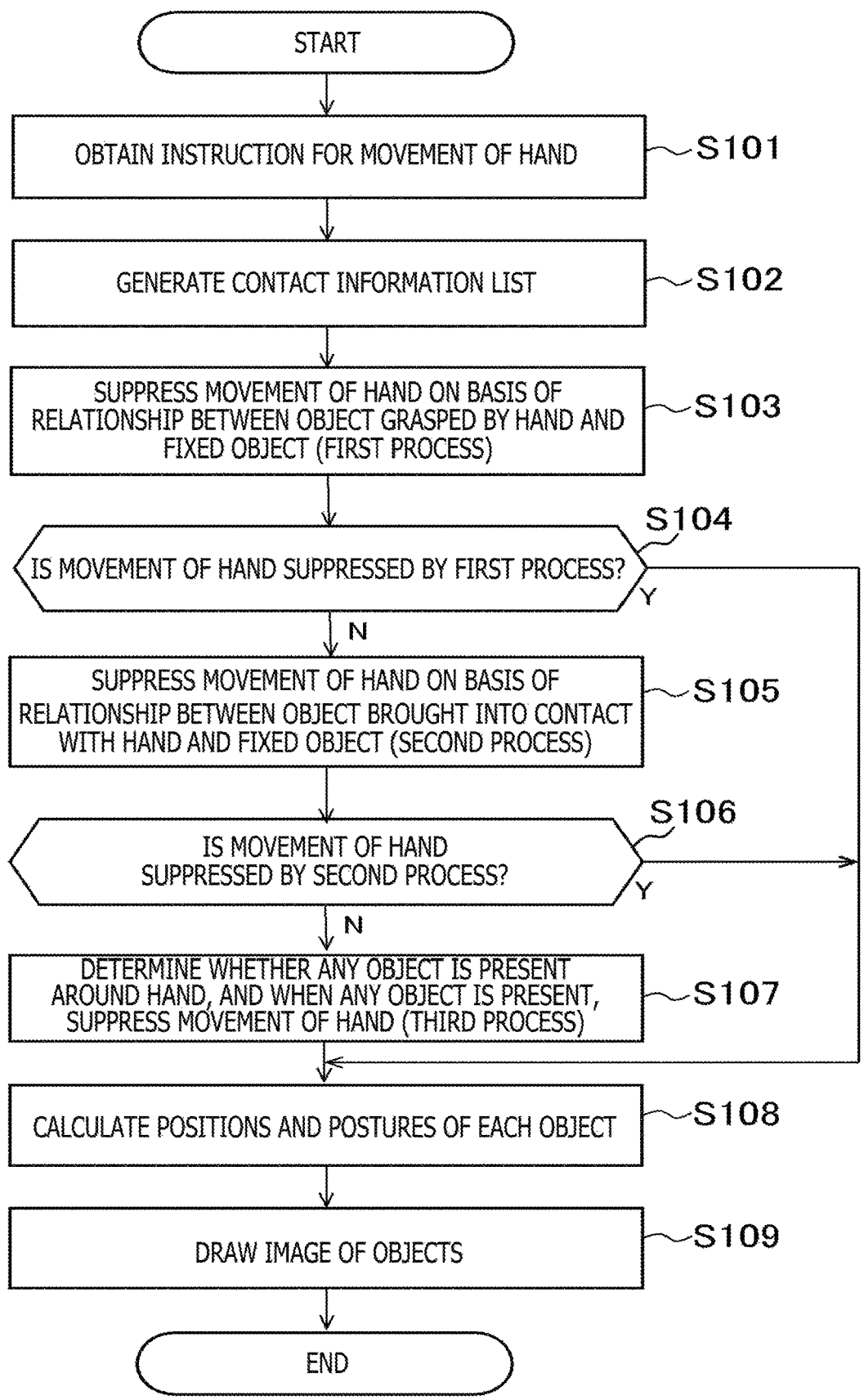
FIG. 4 is a flowchart illustrating an example of a process to be executed by the image processing device.

FIG. 4 is a flowchart illustrating an example of a process to be executed by the image processing device 1. The process illustrated in FIG. 4 is repeatedly executed for each flame (a period of the flame elapses). A flow of the process and a process for each function will be described below.

First, on the basis of the operation of the processor 11, the action obtaining unit 51 obtains the instruction for moving the hand 21 in the virtual space via the input unit 14, calculates information on, for example, the instructed direction 71 of the hand 21 and an instructed movement amount from the instruction, and stores the information in the storage 12 (step S101).

Next, the action suppressing unit 53 generates a contact information list on the basis of the operation of the processor 11 (step S102). The contact information list is generated for each object present in the virtual space. The contact information list includes one or more pieces of contact information. The contact information is generated for each combination of a target object and another object. The contact information indicates that the target object and the other object are brought into contact with each other. Herein the action suppressing unit 53 may determine whether the direct action object 31 brought into direct contact with the hand 21 is grasped by the hand 21 or the direct action object 31 is simply brought into contact with the hand 21. The action suppressing unit 53 may determine that the direct action object 31 is grasped by the hand 21, when the number of fingers brought into contact with the direct action object 31 is three or more, for example.

Figure 5:
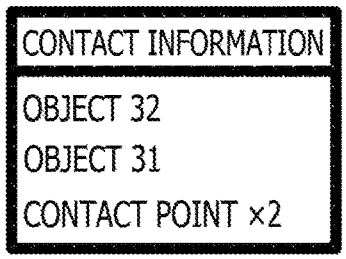
FIG. 5 is a view illustrating examples of contact information lists.
Figure 5:
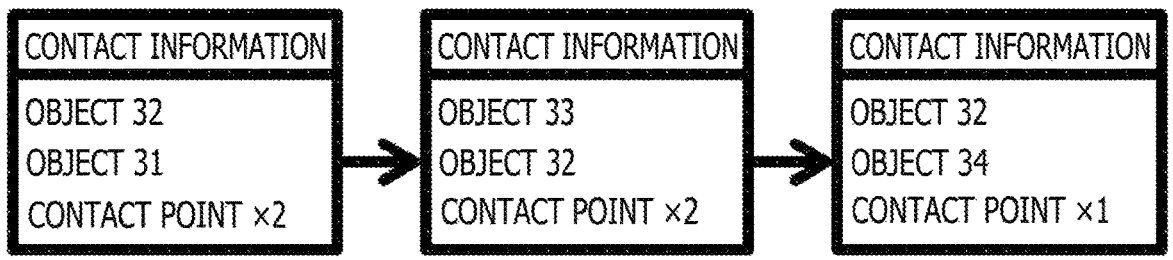
Figure 5:
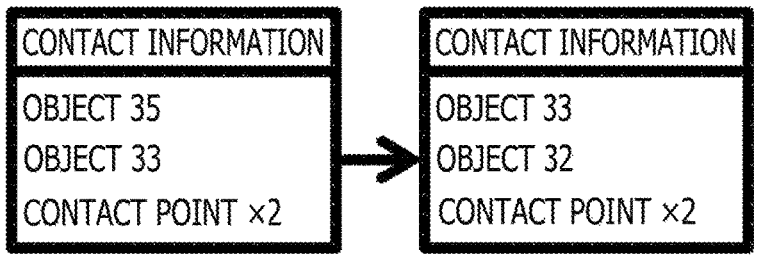
Figure 5:
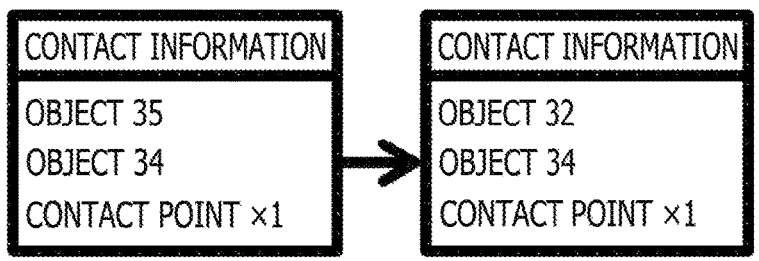

FIG. 5 is a view illustrating examples of the contact information lists, and illustrates the contact information lists that are generated for the example in FIG. 3. In the examples in FIG. 5, the action suppressing unit 53 generates the contact information lists for respective objects 31 to 34. The action suppressing unit 53 generates the contact information for each other object brought into contact with an object corresponding a certain contact information list, and adds the generated contact information to this contact information list. For example, the contact information list for the direct action object 31 includes contact information on collision between the direct action object 31 and the other object 32. The contact information list for the object 33 includes contact information on collision between the object 33 and the object 35 and contact information on collision between the object 33 and the object 32. In addition, each piece of the contact information includes information on a contact point of objects colliding with each other and a collision normal line 72 at the contact point.

When the contact information lists are generated, the action suppressing unit 53 executes a first process for suppressing the movement of the hand 21 on the basis of a relationship between the object held by the hand 21 and a fixed object (step S103).

Figure 6:
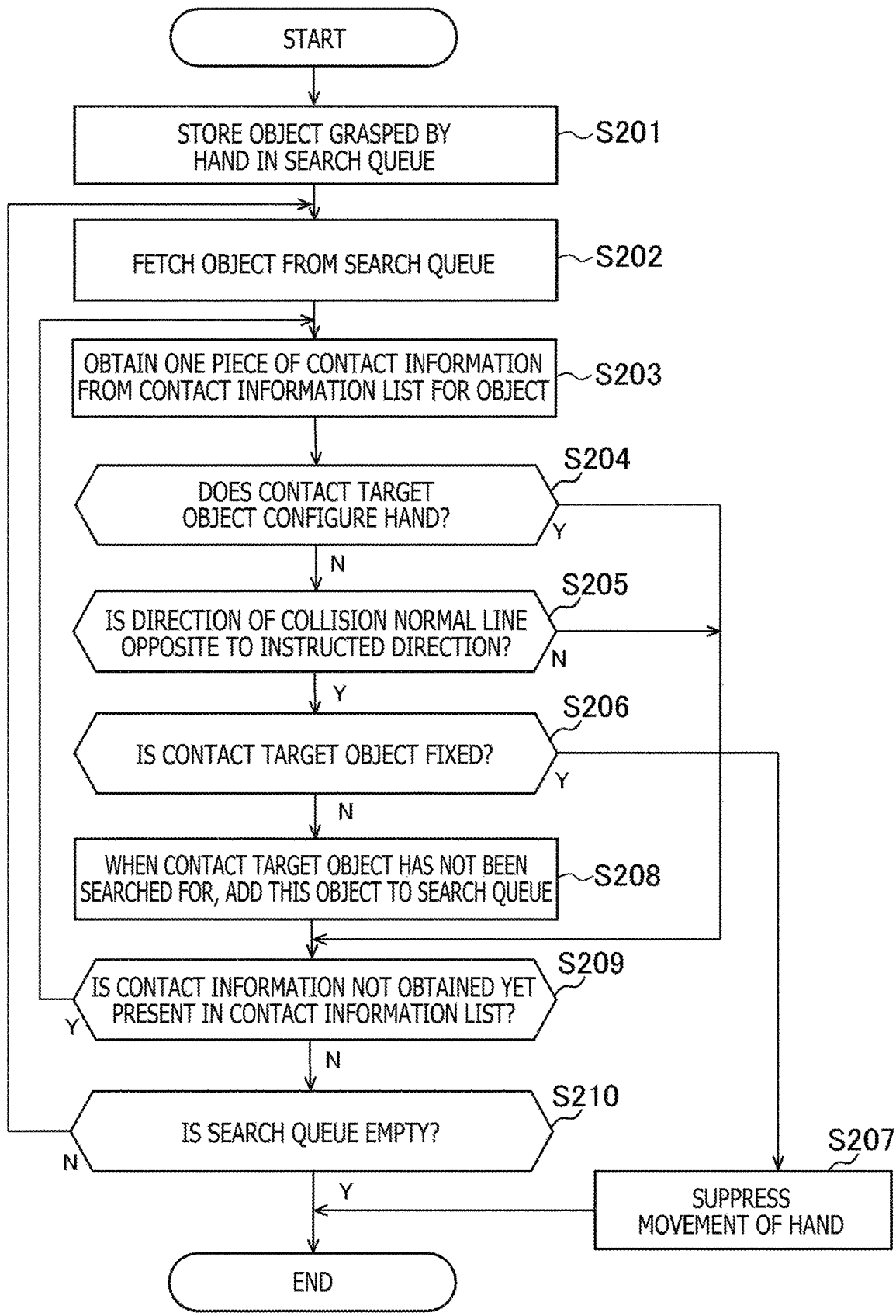
FIG. 6 is a flowchart illustrating an example of a first process.

FIG. 6 is a flowchart illustrating an example of the first process. The first process is a process to be executed when the direct action object 31 is grasped by the hand 21. First, the action suppressing unit 53 stores the object (strictly speaking, identification information of the object) grasped by the hand 21 in a search queue (step S201). Next, the action suppressing unit 53 fetches an object (identification information of the object) from the search queue (step S202). The fetched object serves as a processing target object thereafter.

Next, from the contact information list for the processing target object, the action suppressing unit 53 obtains one piece of contact information (step S203). The action suppressing unit 53 determines whether or not a contact target object included in the obtained contact information is an object configuring the hand 21 (step S204). When the contact target object configures the hand 21 (Y in step S204), other processes are not executed on this contact information, and the flow transits to a process in step S209 described later.

When the contact target object does not configure the hand 21 (N in step S204), the action suppressing unit 53 determines whether the direction of the collision normal line 72 at the contact point of the contact target object is opposite to the instructed direction 71 (step S205). Herein, to determine whether the direction of the collision normal line 72 is opposite to the instructed direction 71, the action suppressing unit 53 determines whether an angle formed with the direction of the collision normal line 72 and the instructed direction 71 falls within a predetermined range centering 180 degrees (more than 90 degrees and less than 270 degrees, at most). In the present embodiment, the action suppressing unit 53 may determine that the two angles are opposite to each other when the formed angle is a range of 170 degrees to 190 degrees, or when the formed angle is more than 90 degrees and less than 270 degrees, for example.

When the direction of the collision normal line 72 is not opposite to the instructed direction 71 (N in step S205), the action suppressing unit 53 does not execute other processes on this contact information, and the flow transits to the process in step S209 described later. In contrast, when the direction of the collision normal line 72 is opposite to the instructed direction 71 (Y in step S205), the action suppressing unit 53 determines whether the contact target object is fixed in the virtual space (step S206).

When the contact target object is fixed in the virtual space (Y in step S206), the action suppressing unit 53 suppresses the movement of the hand 21 (step S207), and terminates the first process. In this case, since vibration of the objects easily occur due to cancellation of the collision between the objects during the movement of the direct action object 31, occurrence of the vibration can be suppressed by suppressing the movement of the hand 21. Herein the action suppressing unit 53 multiplies the speed of the hand 21 by a first coefficient less than one to achieve suppression of the movement of the hand 21.

On the other hand, when the contact target object is not fixed in the virtual space (N in step S206), the action suppressing unit 53 checks whether the contact target object has ever been stored in the search queue. When the contact target object has never been stored in the search queue, the action suppressing unit 53 adds this contact target object to the search queue (step S208). The object stored in the search queue in step S208 serves as a new processing target object in step S202.

The action suppressing unit 53 then determines whether contact information not obtained yet is present in the contact information list (step S209). When the contact information not obtained yet is present (Y in step S209), the action suppressing unit 53 repeats processes from step S203. In contrast, when the contact information not obtained yet is not present (N in step S209), the action suppressing unit 53 determines whether or not the search queue is empty (step S210). When the search queue is not empty (N in S210), the action suppressing unit 53 repeats processes from step S202. When the search queue is empty (Y in step S210), the action suppressing unit 53 terminates the first process.

For example, in the example described in FIG. 3, an object to be stored in the search queue first is the direct action object 31. Therefore, processes from step S202 to step S209 are executed on the direct action object 31. The object 32 is then stored in the search queue. The processes from step S202 to step S209 are also executed on the object 32. However only the object 33 whose direction of the normal line is opposite to the instructed direction 71 is stored in the search queue, and the object 34 is not stored. When the process in step S202 and subsequent processes are executed on the object 33, the process in step S207 is executed due to the object 35 to suppress the movement of the hand 21.

Although not illustrated in FIG. 6, when the movement of the hand 21 is suppressed in a previous flame, and the process for suppressing the movement of the hand 21 in step S207 is not executed in a current flame, the action suppressing unit 53 suppresses the movement of the hand 21 weaker than the previous flame. This can suppress unnatural behavior of the hand 21 due to sudden cancellation of the suppression of the movement of the hand 21.

The first process described above can suppress a phenomenon in which an object present between the hand 21 and the fixed object vibrates due to the movement of the hand 21, when the hand 21 grasps the direct action object 31.

When the first process described in step S103 is terminated and the movement of the hand 21 is suppressed by the first process (Y in step S104), the action suppressing unit 53 skips a second process and a third process described in steps S105 to S107, and executes a process in step S108 and a subsequent process described later.

On the other hand, when the movement of the hand 21 is not suppressed by the first process (N in step S104), the action suppressing unit 53 executes the second process that suppresses the movement of the hand 21 on the basis of a relationship between an object brought into contact with the hand 21 and the fixed object (step S105). In step S105, the object brought into contact with the hand 21 is the direct action object 31 that is brought into contact with the hand 21 and is not grasped by the hand 21. The second process is a process that is executed when the direct action object 31 is the object brought into contact with the hand 21.

The second process is different from the first process in that the object stored in the search queue in step S201 is the object brought into contact with the hand 21 (strictly speaking, identification information of the object), and that the action suppressing unit 53 suppresses the movement of the hand 21 by multiplying the speed of the hand 21 by a second coefficient smaller than one in step S207. The second coefficient is larger than the first coefficient, and therefore strength of suppression of the movement of the hand 21 in the second process is smaller than that in the first process. Other procedures are the same as the first process, and therefore description thereof is omitted.

When the second process is terminated, and the movement of the hand 21 is suppressed by the second process (Y in step S106), the action suppressing unit 53 skips the third process described in step S107, and executes the process in step S108 and the subsequent process described later.

On the other hand, when the movement of the hand 21 is not suppressed by the second process (N in step S106), the action suppressing unit 53 determines whether any object is present around the hand 21. When any object is present, the action suppressing unit 53 executes the third process that suppresses the movement of the hand 21 (step S107).

Figure 7:
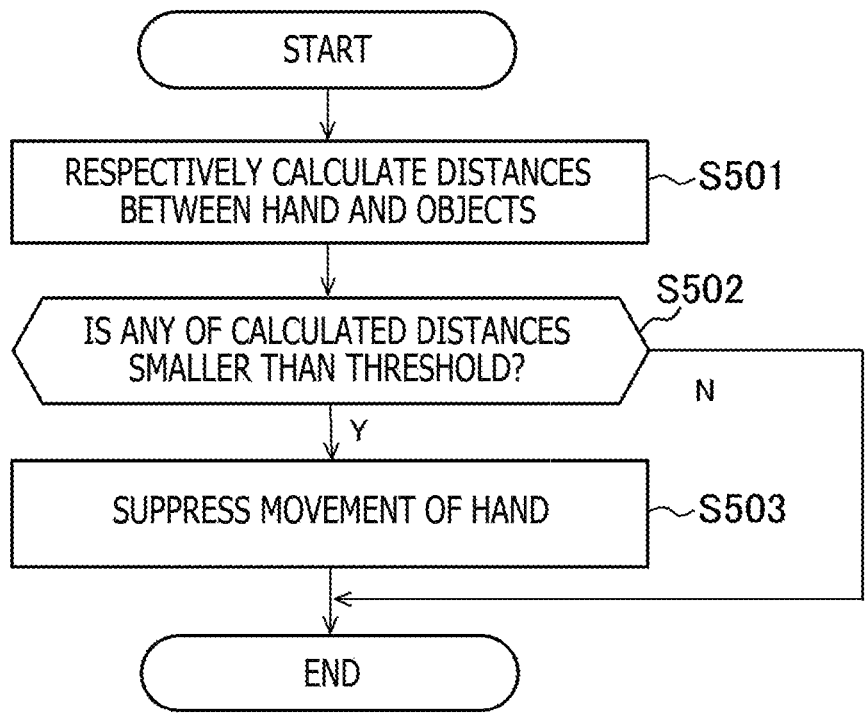
FIG. 7 is a flowchart illustrating an example of a third process.

FIG. 7 is a flowchart illustrating an example of the third process. In the third process, the action suppressing unit 53 first calculates respective distances between the hand 21 and the other objects (step S501). When any of the calculated distances is smaller than a threshold (step S502), the action suppressing unit 53 suppresses the movement of the hand 21 (step S503). Herein the action suppressing unit 53 suppresses the movement of the hand 21 by multiplying the speed of the hand 21 by a third coefficient smaller than one. The third coefficient may not be a constant, and may be a function that decreases monotonically with a decrease in distance. The minimum value of the third coefficient is larger than the first coefficient and the second coefficient (e.g., 0.5), and therefore suppression of the movement of the hand 21 is weaker than that in the first process or the second process.

In step S108, the physical calculation unit 55 performs physical calculation to calculate positions and postures of the plurality of objects including the direct action object 31 in the virtual space. The image drawing unit 57 then draws a three-dimensional image of the plurality of objects on the basis of the calculated positions and postures of those objects (step S109).

Figure 8:
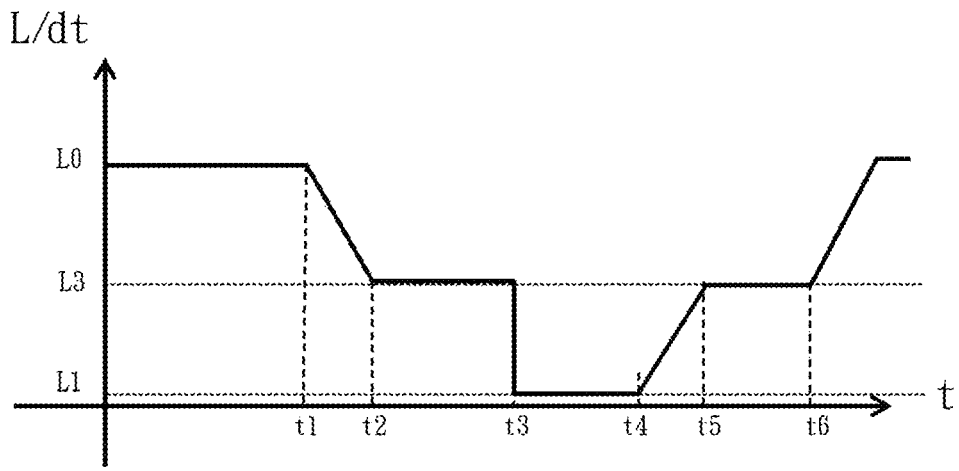
FIG. 8 is a graph illustrating an example of suppression of a movement of the hand when the hand is moved along one direction.

FIG. 8 is a graph illustrating an example of suppression of the movement of the hand 21, when the hand 21 is moved along one direction. The graph in FIG. 8 illustrates a case where an instruction for moving the hand 21 along a certain direction at a constant speed is issued, and illustrates a movement distance per unit time (L/dt) of the hand 21 in the virtual space when the hand 21 grasps an object present in its mid-way, and this object is caused to collide with, for example, a wall.

In the example in FIG. 8, since no object is present near the hand 21 initially, the movement distance per unit time (L0) of the hand 21 is equal to a movement distance in the instruction for movement obtained by the action obtaining unit 51. On the other hand, the object is present near the hand 21 at a time t1, thereby gradually decreasing the movement distance per unit time by the third process. The hand 21 grasps the object at a time t2, thereby causing the movement distance per unit time to be L3. When the object grasped by the hand 21 then collides with the wall at a time t3, the movement of the hand 21 is further suppressed by the first process, thereby causing the movement distance per unit time to be L1.

A period from a time t4 to a time t5 illustrates a state in which the hand 21 is released from being pressed toward the wall, and the hand 21 grasps a certain object. In this period, suppression of the movement of the hand 21 is gradually weakened, thereby increasing the movement distance per unit time from L1 to L3. At a time t6, the hand 21 stops grasping the certain object. After the time t6, suppression of the movement of the hand 21 is further weakened, thereby increasing the movement distance per unit time toward L0.

Figure 9:
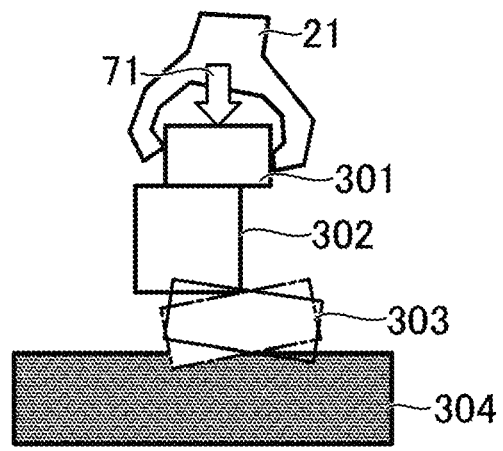
FIG. 9 is a view illustrating a comparative example that causes jittering.

FIG. 9 is a view illustrating a comparative example that causes vibration. In the example in FIG. 9, the hand 21 moves an object 301 toward a fixed object 304. An object 303 that is an object present between the object 301 and the object 304 and is particularly brought into direct contact with the fixed object 304 starts vibrating due to an issue in accuracy when collision is solved with iterative solutions. In contrast, in the present embodiment, strength of pressing an object corresponding to the object 303 against the fixed object can be weakened in such a case. This can suppress vibration even without improving accuracy for solving a collision condition with the iterative solutions. An increase in calculation amount necessary for suppressing vibration can also be suppressed.

Figure 10:
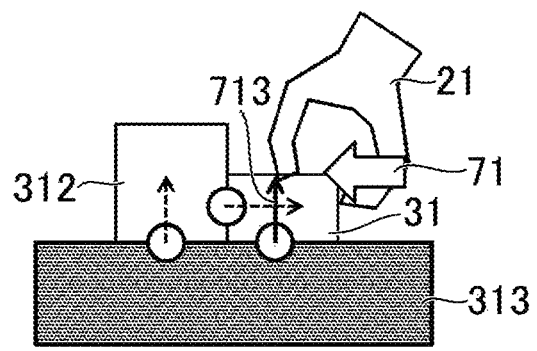
FIG. 10 is a view illustrating another example of the hand and the plurality of objects that are brought into contact with each other.

The image processing device 1 according to the present embodiment performs the process according to the relationship between the collision normal line 72 and the instructed direction 71. This can also suppress a phenomenon making a motion unnatural due to suppression of the movement of the hand 21. FIG. 10 is a view illustrating another example of the hand 21 and the plurality of objects that are brought into contact with each other. In the example in FIG. 10, in an object 313 that is brought into contact with the direct action object 31 and is also fixed, a direction of a collision normal line 713 of the object 313 with respect to the direct action object 31 is not opposite to the instructed direction 71. In the present embodiment, the image processing device 1 does not suppress the movement of the hand 21 in this case. As understood from FIG. 10, the direct action object 31 can horizontally slide when disposed in a real space. Accordingly, when the action suppressing unit 53 does not suppress the movement of the hand 21, this sliding state can be represented naturally.

Figure 11:
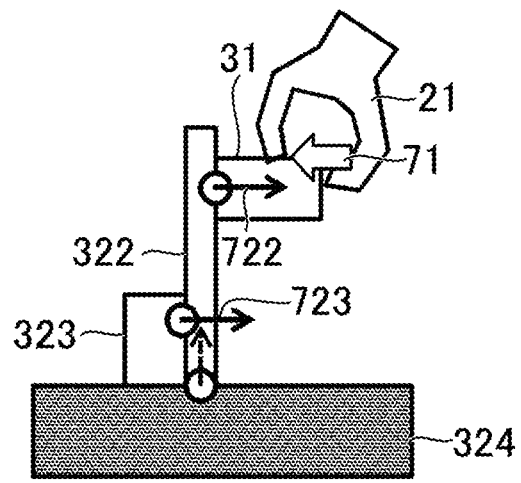
FIG. 11 is a view illustrating yet another example of the hand and the plurality of objects that are brought into contact with each other.

Furthermore, when suppressing the movement of the hand 21, the action suppressing unit 53 does not stop the movement of the hand 21 completely. This can suppress a phenomenon in which a motion of an object becomes considerably unnatural in a specific situation. FIG. 11 is a view illustrating yet another example of the hand 21 and the plurality of objects that are brought into contact with each other. In the example in FIG. 11, an object 322 that is brought into contact with the direct action object 31 and whose collision normal line 722 is opposite to the instructed direction 71, and a fixed object 323 that is brought into contact with the object 322 and whose collision normal line 723 is opposite to instructed direction 71 are present. In this case, in the present embodiment, the movement of the hand 21 is suppressed. Herein, when the action suppressing unit 53 does not stop the movement of the hand 21 completely, the direct action object 31 can be moved due to rotation of the object 322. This allows the direct action object 31 and the object 322 that are able to be moved in the real space to be moved although their speeds are low, thereby suppressing the motion from becoming considerably unnatural.

The invention claimed is:

1. An image processing device comprising:
    an obtaining unit operating to obtain a movement toward a given direction of at least one point of a first object in a virtual space;
    a suppressing unit operating to suppress the movement of the at least one point of the first object, when a second object that is brought into contact with the first object and whose angle formed with a direction of a reaction force to the first object and the given direction falls within a predetermined range is present, and a movement of the second object is limited in the virtual space;
    a calculation unit operating to calculate a motion of the first object on a basis of the suppressed movement of the at least one point; and
    an image drawing unit operating to draw an image including the first object on a basis of the calculated motion,
    wherein the suppressing unit searches for a new second object that is brought into contact with the second object and whose angle formed with a direction of a reaction force to the second object and the given direction falls within the predetermined range, when the second object whose angle formed with the direction of the reaction force to the first object and the given direction falls within the predetermined range is present, and the movement of the second object is not limited in the virtual space, and suppresses the movement of the at least one point of the first object when the new second object is fixed.

2. The image processing device according to claim 1, wherein the suppressing unit suppresses the movement of the at least one point of the first object, when the second object that is brought into contact with the first object and whose angle formed with the direction of the reaction force to the first object and the given direction falls within the predetermined range is present, and the second object is fixed in the virtual space.

3. The image processing device according to claim 1, wherein the suppressing unit generates a contact information list for each object present in the virtual space, said contact information includes information on a contact point of each object colliding with each other and a collision normal line at the contact point that defines a vector of at least one of the colliding objects.

4. The image processing device according to claim 1, wherein the direction of the reaction force to the first object is a direction of a normal line at a contact point of the second object with the first object.

5. The image processing device according to claim 1, wherein the obtaining unit obtains an instruction for a movement of an instruction target object that is brought into contact with the first object at the at least one point, and obtains a direction of the movement of the instruction target object as the given direction.

6. The image processing device according to claim 5, wherein the suppressing unit calculates a distance between the instruction target object and a peripheral object, and suppresses the movement of the instruction target object when the distance satisfies a given condition.

7. The image processing device according to claim 6, wherein the suppressing unit suppresses a motion of a hand stronger than a case where the distance satisfies the given condition, when the second object that is brought into contact with the first object and whose angle formed with the direction of the reaction force to the first object and the given direction falls within the predetermined range is present, and the movement of the second object is limited in the virtual space.

8. An image processing method comprising:
obtaining a movement toward a given direction of at least one point of a first object in a virtual space;
suppressing the movement of the at least one point of the first object, when a second object that is brought into contact with the first object and whose angle formed with a direction of a reaction force to the first object and the given direction falls within a predetermined range is present, and a movement of the second object is limited in the virtual space;
calculating a motion of the first object on a basis of the suppressed movement of the at least one point;
drawing an image including the first object on a basis of the calculated motion; and
searching for a new second object that is brought into contact with the second object and whose angle formed with a direction of a reaction force to the second object and the given direction falls within the predetermined range, when the second object whose angle formed with the direction of the reaction force to the first object and the given direction falls within the predetermined range is present, and the movement of the second object is not limited in the virtual space, and suppresses the movement of the at least one point of the first object when the new second object is fixed.

9. A non-transitory, computer readable storage medium containing a computer program, which when executed by a computer, causes the computer to carry out actions, comprising:
obtaining a movement toward a given direction of at least one point of a first object in a virtual space;
suppressing the movement of the at least one point of the first object, when a second object that is brought into contact with the first object and whose angle formed with a direction of a reaction force to the first object and the given direction falls within a predetermined range is present, and a movement of the second object is limited in the virtual space;
calculating a motion of the first object on a basis of the suppressed movement of the at least one point;
drawing an image including the first object on a basis of the calculated motion; and
searching for a new second object that is brought into contact with the second object and whose angle formed with a direction of a reaction force to the second object and the given direction falls within the predetermined range, when the second object whose angle formed with the direction of the reaction force to the first object and the given direction falls within the predetermined range is present, and the movement of the second object is not limited in the virtual space, and suppresses the movement of the at least one point of the first object when the new second object is fixed.

* * * * *